(12) United States Patent
Ding et al.

(10) Patent No.: US 8,355,601 B2
(45) Date of Patent: Jan. 15, 2013

(54) REAL-TIME GEOMETRY AWARE PROJECTION AND FAST RE-CALIBRATION

(75) Inventors: Yuanyuan Ding, Newark, DE (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 542 days.

(21) Appl. No.: 12/688,417

(22) Filed: Jan. 15, 2010

(65) Prior Publication Data

US 2011/0176007 A1  Jul. 21, 2011

(51) Int. Cl.
G06K 9/32 (2006.01)
(52) U.S. Cl. ........ 382/294; 382/293; 382/199; 382/154; 348/189
(58) Field of Classification Search .................. 382/293, 382/294, 199, 154, 295, 296, 297, 298; 348/187, 348/189, 580; 353/94, 70, 69; 345/619, 345/689
See application file for complete search history.

(56) References Cited

U.S. PATENT DOCUMENTS

| | | | |
|---|---|---|---|
| 6,527,395 B1 * | 3/2003 | Raskar et al. | 353/70 |
| 6,618,076 B1 | 9/2003 | Sukthankar et al. | |
| 7,215,362 B2 | 5/2007 | Klose | |
| 7,306,341 B2 | 12/2007 | Chang | |
| 7,768,527 B2 * | 8/2010 | Zhang et al. | 345/619 |
| 2007/0115484 A1 * | 5/2007 | Huang et al. | 356/604 |
| 2007/0171381 A1 | 7/2007 | Tan et al. | |
| 2007/0171382 A1 | 7/2007 | Tan et al. | |
| 2008/0095468 A1 | 4/2008 | Klemmer et al. | |
| 2012/0038739 A1 * | 2/2012 | Welch et al. | 348/14.01 |

OTHER PUBLICATIONS

Raskar, R., et al., "iLamps: Geometrically Aware and Self-Configuring Projectors", ACM SIGGRAPH 2003 Conference Proceedings.
Seitz, S., et al., "A Theory of Inverse Light Transport", Proceedings IEEE International Conference on Computer Vision (ICCV), 2005.
Sen, P., et al., "Dual Photography", ACM SIGGRAPH 2005 conference proceedings, 2005.
Zhang, Z., "A Flexible New Technique for Camera Calibration", IEEE Transactions on Pattern Analysis and Machine Intelligence, vol. 22, No. 11, Nov. 2000.
Bimber, O., et al., "Enabling View-Dependent Stereoscopic Projection in Real Environments", In ISMAR '05: Proceedings of the 4th IEEE/ACM International Symposium on Mixed and Augmented Reality, pp. 14-23, 2005.
Cotting, D., et al., "Embedding Imperceptible Patterns into Projected Images for Simultaneous Acquisition and Display", In ISMAR '04: Proceedings of the 3rd IEEE/ACM International Symposium on Mixed and Augmented Reality, pp. 100-109, 2004.

(Continued)

Primary Examiner — Ali Bayat

(57) ABSTRACT

Aspects of the present invention include systems and methods for recalibrating projector-camera systems. In embodiments, systems and methods are able to recalibrate automatically the projector with arbitrary intrinsic and pose, as well as render for arbitrarily desired viewing point. In contrast to previous methods, the methods disclosed herein use the observing camera and the projector to form a stereo pair. Structured light is used to perform pixel-level fine reconstruction of the display surface. In embodiments, the geometric warping is implemented as a direct texture mapping problem. As a result, re-calibration of the projector movement is performed by simply computing the new projection matrix and setting it as a camera matrix. For re-calibrating the new view point, the texture mapping is modified according to the new camera matrix.

19 Claims, 12 Drawing Sheets

OTHER PUBLICATIONS

Cotting, D., et al., "Adaptive Instant Displays: Continuously Calibrated Projections Using Per-Pixel Light Control", In Proc. of Eurographics 2005, Eurographics Association, pp. 705-714, 2005.

Ding, Y., et al., "Catadioptric Projectors", In Proceedings IEEE International Conference on Computer Vision and Pattern Recognition (CVPR), 2009.

Johnson, T., et al., "Real-Time Projector Tracking on Complex Geometry Using Ordinary Imagery", IEEE International Workshop on Projector-Camera Systems (ProCams2007), (Jun. 2007).

Raij, A., et al., "Auto-Calibration of Multi-Projector Display Walls", In Proc. Int. Conf. on Pattern Recognition, vol. I, pp. 14-17, 2004.

Raskar, R., et al., "A Self Correcting Projector", In Proceedings of Computer Vision and Pattern Recognition, pp. 504-508, 2001.

Raskar, R., et al., "Multi-Projector Displays Using Camera-Based Registration", In Vis '99, Proceedings of the conference on Visualization, IEEE Computer Society Press, 1999.

Sun, W., et al., "Calibrating Multi-Projector Cylindrically Curved Displays for "Wallpaper" Projection", In PROCAMS '08, Proceedings of the 5th ACM/IEEE International Workshop on Projector camera systems, pp. 1-8, 2008.

Sun, W., et al., "Robust Checkerboard Recognition for Efficient Nonplanar Geometry Registration in Projector-camera Systems", In PROCAMS '08, Proceedings of the 5th ACM/IEEE International Workshop on Projector camera systems, pp. 1-7, 2008.

Wetzstein, G., et al., "Radiometric Compensation through Inverse Light Transport", In PG'07, Proceedings of the 15th Pacific Conference on Computer Graphics and Applications, pp. 391-399, 2007.

Yang, R., et al., "Automatic Projector Display Surface Estimation Using Every-Day Imagery", In the 9th International Conference in Central Europe on Computer Graphics, Visualization and Computer Vision, 2001.

Zhou, J., et al., "Multi-Projector Display with Continuous Self-Calibration", In PRO-CAMS '08, Proceedings of the 5th ACM/IEEE International Workshop on Projector Camera Systems, pp. 1-7, 2008.

Zeiss, C., "Automatic Projector Calibration for any Type of Screen", Fraunhofer Institute for Computer Architecture and Software Technology FIRST, Aug. 2007.

Bhasker, E., et al., "Advances Towards Next-Generation Flexible Multi-Projector Display Walls", Assoc. for Computing Machinery, Inc., 2007.

Chen, Y., et al., "Automatic Alignment of High-Resolution Multi-Projector Displays Using an Un-Calibrated Camera", , IEEE Visualization archive Proceedings of the conference on Visualization '00, 2000, pp. 125-130.

Ashdown, M., et al., "Robust Calibration of Camera-Projector System for Multi-Planar Displays", Cambridge Research Laboratory, HP Laboratories Cambridge, Jan. 30, 2003.

\* cited by examiner

700

Perform a distance transform to compute a distance map from the hole pixels to valid pixels — 705

For each hole, find a local maximum of the distance map and use that local maximum to define a local window size — 710

Compute a delaunay triangulation/tetrahedralization using valid points in the local window size and interpolate to fill the hole — 715

Calculating the translation and rotation of the camera with respect to the fixed capturing camera — 915

↓

Using the same intrinsic parameters, compute a new projection matrix — 920

↓

Set the new projection matrix as an input of a vertex shader and compute texture coordinates for at least some of the vertices in a 3D point cloud — 925

FIGURE 9

REAL-TIME GEOMETRY AWARE PROJECTION AND FAST RE-CALIBRATION

BACKGROUND

A. Technical Field

The present invention pertains generally to projector-camera systems, and relates more particularly to adaptive projector display systems.

B. Background of the Invention

The increasing prevalence of multimedia systems, such as computer systems, gaming system, videoconference systems, projector systems, and home theater systems, has resulted in projector display systems operating within a wide variety of conditions. Adaptive projector display systems have been developed to address projection under various conditions. For example, research into adaptive projector display systems have attempted to find ways to correct for color distortions, display surface distortions, and other calibration issues. The research in this area has resulted in methods that improve the robustness of the projector systems.

As these systems are increasing being used by average consumers who are unfamiliar with projection technology and calibration techniques, it is beneficial to develop calibration and correction methods that require little or no user input. There is a sizable body of literature related to adaptive projector displays. Accordingly, it would be impossible to summarize all of the prior attempts. Rather, presented below are some approaches to calibration that involve little or no user interaction.

Raij and Pollefeys proposed an automatic method for defining the display area on a plane, removing the need for physical fiducials and measurement of the area defined by them. Planar auto-calibration can be used to determine the intrinsics of an array of projectors projecting on a single plane. The camera, projectors, and display plane are then reconstructed using a relative pose estimation technique for planar scenes. Raij and Pollefeys describe their technique in "Auto-Calibration of Multi-Projector Display Walls," In *Proc. Int'l. Conf on Pattern Recognition (ICPR)*, Volume I, pages 14-17, 2004, which is incorporated herein by reference in its entirety.

Raskar and others investigated how to use projectors in a flexible way. Their basic display unit is a projector with sensors, computation, and networking capability. It can create a seamless display that adapts to the surfaces or objects on which it is projecting. Display surfaces with complex geometries, such as a curved surface, can be handled. Their technique is described in R. Raskar, M. S. Brown, R. Yang, W. C. Chen, G. Welch, H. Towles, B. Seales, and H. Fuchs, "Multi-projector displays using camera-based registration," In *VIS '99: Proceedings of the conference on Visualization '99*, pages 161-168, Los Alamitos, Calif., USA, 1999 (IEEE Computer Society Press), which is incorporated herein by reference in its entirety.

Yang and Welch disclose using features in the imagery being projected for matching between a pre-calibrated projector and camera to automatically determine the geometry of the display surface. One issues with this approach, however, it that the estimation algorithm works in an iterative manner and is not suitable for continuous correction in real time. Yang and Welch discuss their technique in R. Yang and G. Welch, "Automatic projector display surface estimation using everyday imagery," *Proc. Ninth International Conference in Central Europe on Computer Graphics, Visualization, and Computer Vision*, 2001, which is incorporated herein by reference in its entirety.

Instead of matching features across images, there are active techniques where calibration aids are embedded into user imagery. For instance, D. Cotting and others discussed embedding imperceptible calibration patterns into the projected images. The approach takes advantage of the micromirror flip sequence in Digital Light Processing (DLP) projectors and slightly modifies the per-pixel intensity to let the synchronized camera capture the desired pattern. These approaches can be found in D. Cotting, M. Naef, M. Gross, and H. Fuchs, "Embedding Imperceptible Patterns Into Projected Images For Simultaneous Acquisition And Display," *ISMAR '04: Proceedings of the 3rd IEEE/ACM International Symposium on Mixed and Augmented Reality*, pages 100-109, Washington, D.C., USA, 2004 (IEEE Computer Society); and D. Cotting, R. Ziegler, M. Gross, and H. Fuchs, "Adaptive Instant Displays: Continuously Calibrated Projections Using Per-Pixel Light Control," *Proceedings of Eurographics 2005*, Eurographics Association, pages 705-714, 2005 (Dublin, Ireland, Aug. 29-Sep. 2, 2005), each of which is incorporated herein by reference in its entirety. However, one major drawback of such an approach is that it requires a portion of the projector's dynamic range to be sacrificed, which will, in turn, cause a degradation of the imagery being projected.

One approach demonstrated the ability to calibrate a projector on an arbitrary display surface without modifying the projected imagery. This approach was disclosed by T. Johnson and H. Fuchs in "Real-Time Projector Tracking on Complex Geometry using Ordinary Imagery," In *Proc. of IEEE International Workshop on Projector-Camera Systems (ProCams)* (2007), which is incorporated herein by reference in its entirety. This approach employed a calibrated stereo camera pair to first reconstruct the surface by observing structured light pattern provided by the projector. The approach also assumed the surface to be piecewise planar and used RANSAC for fitting a more precise geometric description of the displaying surface. By matching features between the user image stored in frame buffer and the projected image captured by a stationary camera, the approach re-estimates the pose of the projector.

Most of these techniques assume a fixed viewing point, and they typically employ a stereo camera pair for reconstructing and tracking of the projector with constant intrinsic projection matrix. While these methods offer some advantages over prior display options, the system calibration is often a tedious undertaking. Moreover, re-calibration is required to render for new viewing positions.

SUMMARY OF THE INVENTION

To alleviate the aforementioned limitations, presented herein are systems and methods employing, in embodiments, a single camera and a single projector with an arbitrary displaying surface. In embodiments, systems and methods are able to recalibrate automatically the projector with arbitrary intrinsics and pose, as well as render for arbitrarily desired viewing point. In contrast to previous methods, the methods disclosed herein use the observing camera and the projector to form a stereo pair. In embodiments, structured light is used to perform pixel level fine reconstruction of the display surface.

In embodiments, the geometric warping is implemented as a direct texture mapping problem. Accordingly, in embodiments, re-calibration of the projector movement is performed by computing the new projection matrix and setting it as an Open Graphics Library (OpenGL) camera matrix. In embodiments, for re-calibrating the new viewpoint, the texture mapping is modified according to the new camera matrix. In embodiments, the methods are implemented using OpenGL and OpenGL Shading Language (GLSL), which enables the systems and methods of rendering videos in real-time. It shall be noted that different applications and application program interfaces other than OpenGL and GLSL may be used.

The methods presented herein may be contained in a computer program product comprising at least one computer-readable medium storing one or more sequences of instructions, wherein execution of the one or more sequences of instructions by one or more processors causes the one or more processors to execute a computer-implemented method for calibrating a projector system. Embodiments of the present invention include a computer system or systems for calibrating a projector system comprising a projector and a camera.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 7 depicts a method for filling holes in the reconstructed display surface according to various embodiments of the invention.

FIG. 9 illustrates a method of recalibrating a projector-camera system due to camera movement according to various embodiments of the invention.

DETAILED DESCRIPTION OF THE PREFERRED EMBODIMENTS

Figure 1:
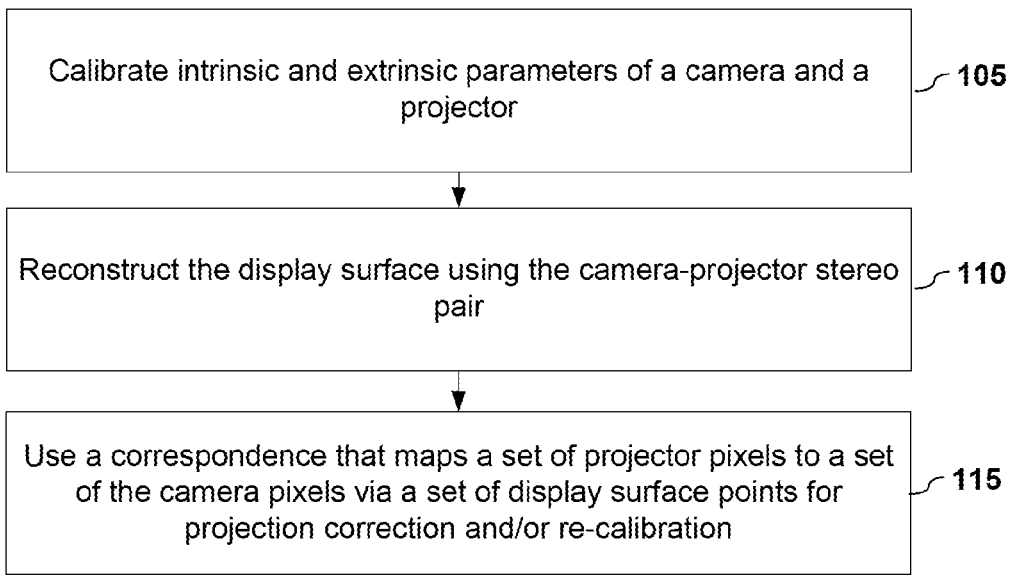
FIG. 1 presents a method for automatic recalibration of a projector-camera system according to various embodiments of the present invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices, including by way of illustration and not limitation, multimedia systems, theater systems, video conference systems, projection systems, gaming systems, computer systems, and the like. Aspects of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "an embodiment," or "embodiments," means that a particular feature, structure, characteristic, or function described in connection with the embodiment or embodiments is included in at least one embodiment of the invention and may be in more than one embodiment. The appearances of the phrase "in one embodiment," or "in an embodiment," or "in embodiments," in various places in the specification are not necessarily all referring to the same embodiment or embodiments.

A. Overview

Presented herein are systems and methods for adaptive projector display systems with user-friendly and robust auto-recalibration and which are capable of rendering perspective-correct imagery for arbitrary specified viewing points. Many researchers have been interested in this problem and have proposed different methods. Prior attempts described general methods of correcting for geometric distortions that occur when non-planar surfaces are used for display. Other approaches proposed performing automatic calibration, which avoid display interruption in the event that the display configuration changes. Some auto-calibration techniques used calibration aids (e.g., imperceptible calibration patterns in the projected imagery). Passive ones, instead, detect and match features in user imagery to automatically estimate the geometry of the display surface.

Most of these techniques assume a fixed viewing point, and they typically employ a stereo camera pair for reconstructing and tracking of the projector with constant intrinsic projection matrix. While these methods offer some advantages over other display options, the system calibration is often a tedious undertaking. Moreover, re-calibration is required to render for new viewing positions.

The systems and methods presented herein are fundamentally different than these prior approaches. First, in embodiments, the present systems and methods use a camera together with a projector to reconstruct fine (per-pixel level) details of the display surface. In contrast to previous methods, the observing camera and the projector are used to form a stereo pair. Second, in embodiments, the systems and methods can allow for the change of both the intrinsic and the extrinsic (pose) projection matrix of the projector during display. Third, in embodiments, the systems and methods also enable arbitrary user desired change of viewing position.

The systems and methods presented herein alleviate the aforementioned limitations of the prior approaches. In embodiments, a single camera and a single projector with arbitrary displaying surface that is able to recalibrate automatically the projector with arbitrary intrinsic and extrinsic (pose), as well as render for arbitrarily desired viewing point.

B. Method Embodiments

1. General Method

Figure 2:
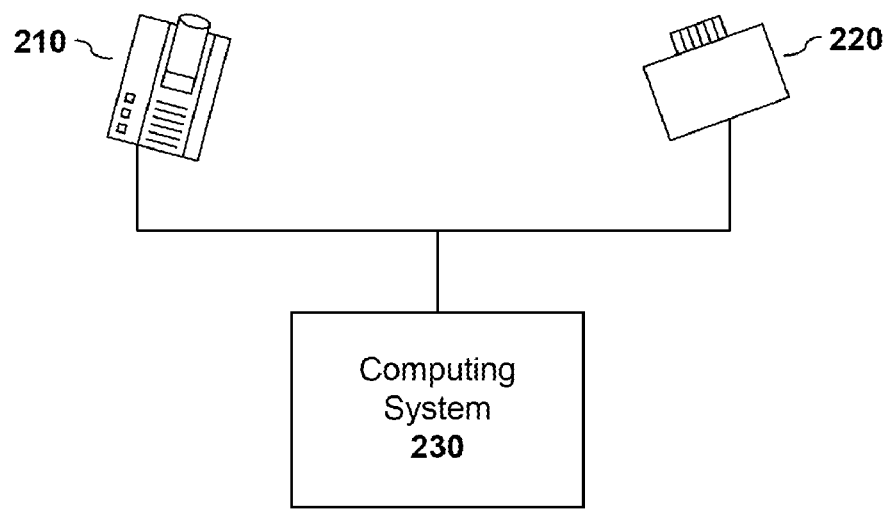
FIG. 2 illustrates a projector-camera system according to various embodiments of the invention.

FIG. 1 presents a general method for automatic recalibration of a projector-camera system according to various embodiments of the present invention. FIG. 2 depicts a typical projector-camera system configuration according to embodiments of the present invention. The system 200 comprises a projector 210 and a camera 220, each of which is coupled to a computing system 230. Computing system 230 interfaces with the projector 210 to supply images to the projector 210 for projection and interfaces with the camera 220 to receive images captured by the camera 220. Also depicted in a display surface 240, which may be an arbitrary, non-planar surface.

In the embodiment depicted in FIG. 1, the method 100 commences by calibrating 105 the intrinsic and extrinsic parameters of a camera and a projector. Given the calibrated projector-camera stereo pair, a display surface can be reconstructed 110. Reconstructing the display surface establishes a correspondence that maps a set of projector pixels to a set of the camera pixels via a set of display surface points. This correspondence to the displace surface can be used 115 to help recalibrate the projector-camera system if either the projector or the camera is moved and/or for projector correction. Various embodiments of these steps are described below.

Figure 3:
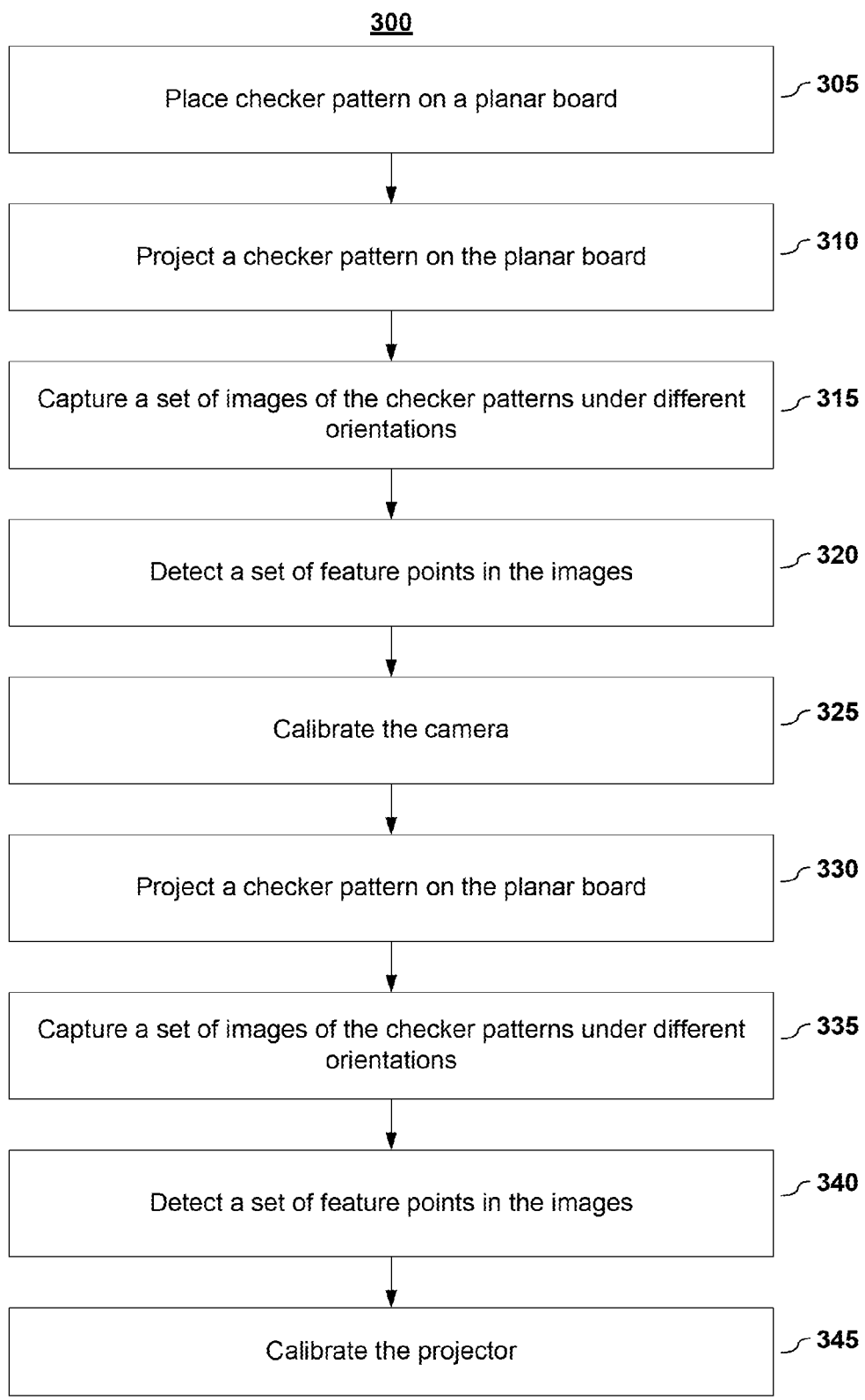
FIG. 3 depicts a method for calibrating a camera and a projector according to various embodiments of the invention.

2. Calibrating Intrinsic and Extrinsic Parameters of the Camera and the Projector FIG. 3 depicts a method 300 for calibrating a camera and a projector according to various embodiments of the invention. The method 300 of FIG. 3 is an embodiment of a method that may be used to calibrate 105 (FIG. 1) the intrinsic and extrinsic parameters of a camera and a projector.

A projector (e.g., projector 210) may be treated as a dual of a pinhole camera and its intrinsic and extrinsic parameters can be expressed in the same way as those of a camera (e.g., camera 220). In embodiments, a checker pattern with red-white color (although one skilled in the art shall recognize that other colors may be used) is placed 305 on a planar board, such as display surface 240. Another checker pattern with green-white color (although one skilled in the art shall recognize that other colors may be used) of the same row and column number is projected 310 onto the board. A set of images of the checker patterns can be captured 315 by the camera. The parts of the patterns, such as the corners, can be detected 320, 340 as featured points and used for calibration 325, 345.

Since the two checker patterns are on the same plane, the correspondence in the camera image and the projector image satisfy the same homography constraint. Let $x_{cr}(r_x^c, r_y^c)$ and $x_{cg}(g_x^c, g_y^c)$ denote the red and green corners in the camera image, and let $x_{pg}(g_x^p, g_y^p)$ denote the green corners in the projector image. The corner positions are estimated such that if a pattern with corners $x_{pr}(r_x^p, r_y^p)$ is projected, the projected pattern should coincide with the real red checkerboard pattern. Thus, we have:

$$[g_x^c, g_y^c, 1] = H \cdot [g_x^p, g_y^p, 1]$$

$$[r_x^c, r_y^c, 1] = H \cdot [r_x^p, r_y^p, 1] \quad (1)$$

Using $x_{cg}$ and $x_{pg}$, the homography, H, can be computed, where H is a 3-by-3 matrix. Solving for the inverse of the homography, $H^{-1}$, Equation (1) can be written as:

$$[r_x^p, r_y^p, 1] = H^{-1} \cdot [r_x^c, r_y^c, 1] \quad (2)$$

By capturing 315 a set of images containing the real red checkerboard pattern and the green projected pattern, a set of estimated image corners $x_{pr}$ can be obtained. Thus, the calibrating process is exactly the same way as done for calibrating the camera.

In embodiments, since the projector and the camera are expected to be calibrated within the same coordinate system, it is important to keep the order of the detected corners consistent with the real checkerboard and the pattern in the projector images.

In embodiments, the calibrating process may be simplified by separating the calibration of the camera and the projector. In embodiments, calibration of the camera may be performed using a calibration method, such as (by way of example and not limitation) Zhang's method, which is discussed in Z. Zhang, "A Flexible New Technique for Camera Calibration," *IEEE Transactions on Pattern Analysis and Machine Intelligence*, vol. 22, no. 11, pp. 1330-1334, 2000, which is incorporated herein by reference in its entirety. It shall be noted that Zhang's method for calibration is well known to those of ordinary skill in the art; and, those skilled in the art shall recognize other methods may be used for calibration and that no particular calibration method is critical to the present invention. A set of images with checker pattern may be projected 330 onto a plane of various positions and poses and captured 335. It should be noted that the projection matrix, $P_c$, of the camera is already known, and the projector projection matrix, $P_p$, is to be computed.

Given:

$$[g_x^p, g_y^p, 1] = P_p \cdot [G_x, G_y, G_z, 1]$$

$$[g_x^c, g_y^c, 1] = P_c \cdot [G_x, G_y, G_z, 1] \quad (3)$$

Notice also that:

$$[g_x^c, g_y^c, 1] = H \cdot [g_x^p, g_y^p, 1] \quad (4)$$

Using a set of features, such as $x_{cg}$ and $x_{pg}$, the homography, H, can be computed. Also noted that:

$$H \cdot P_p = P_c \quad (5)$$

Thus, for every checkerboard corner position, there is a linear system. Singular value decomposition (SVD) can be used to solve for the projection matrix for the projector, $P_p$.

3. Reconstructing a Display Surface

Figure 4:
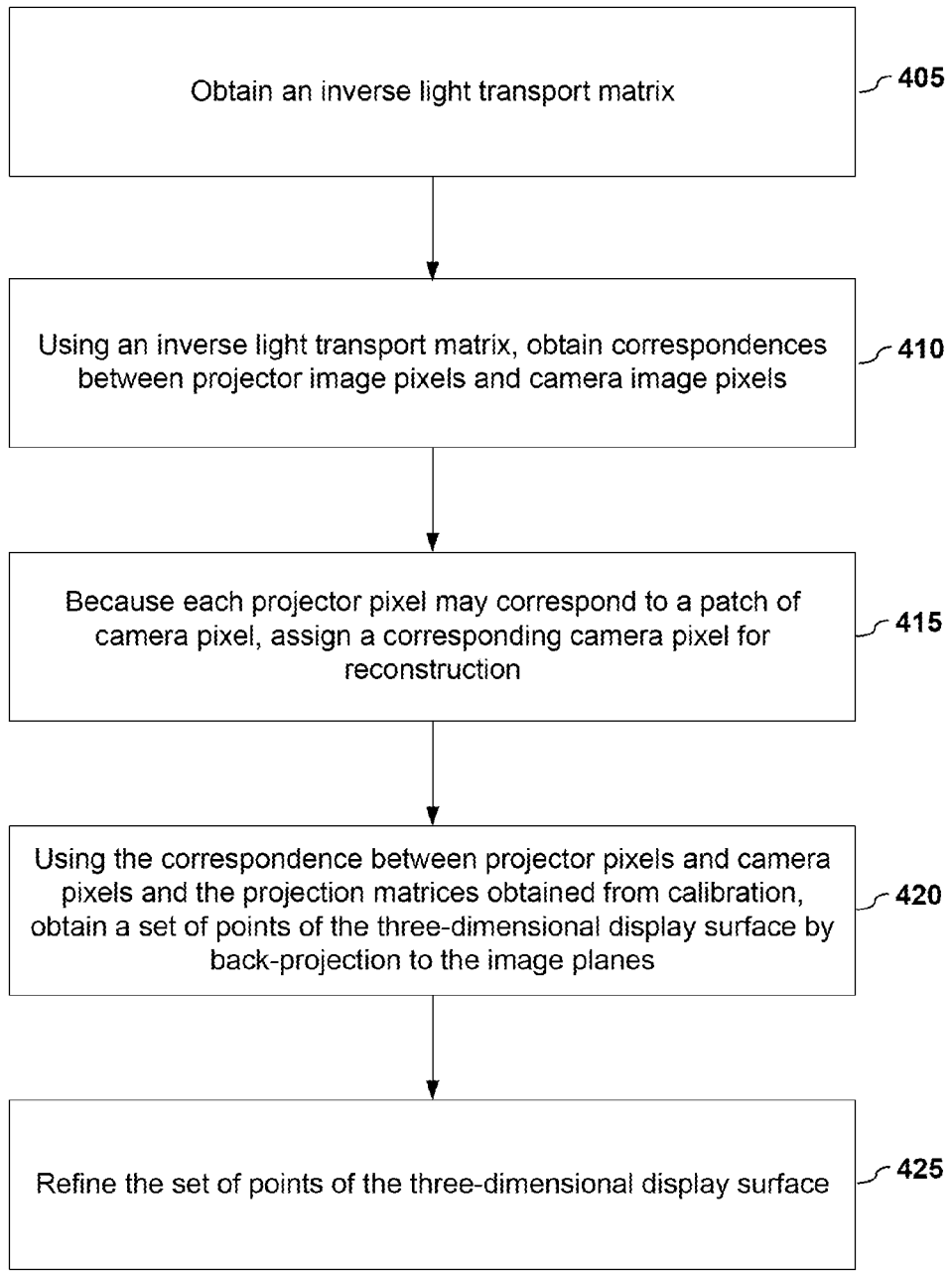
FIG. 4 depicts a method for reconstructing a display surface according to various embodiments of the invention.

The camera and the projector form a valid stereo pair. After calibrating the camera and the projector, the displaying surface can be reconstructed using triangulation. FIG. 4 depicts a method for reconstructing a display surface according to various embodiments of the invention.

In the embodiment depicted in FIG. 4, the method 400 commences by obtaining 405 an inverse light transport matrix or an approximation of an inverse light transport matrix for the display surface. The inverse light transport matrix or an approximation of an inverse light transport matrix can directly be used to acquire 410 the correspondences between the projector pixels and the camera pixels. Because the camera image typically will contain more pixels than the projector, for each projector pixel, a patch of camera pixels may be counted. In embodiments, the centroid of this patch of camera pixels may be used 415 as the corresponding pixel for reconstruction.

The calibration process yielded the projection matrices of the camera and the projector, which can be used in reconstructing a display surface. In embodiments, the three-dimensional display structure may be determined by the back-projection to the image planes. For every pixel with homogeneous coordinate [u, v, 1] and its corresponding three-dimensional coordinates X[x, y, z, 1], we have:

$$\begin{bmatrix} u \cdot w \\ v \cdot w \\ w \end{bmatrix} = P \cdot X = \begin{bmatrix} P_1 \\ P_2 \\ P_3 \end{bmatrix} \cdot \begin{bmatrix} x \\ y \\ z \\ 1 \end{bmatrix}, \text{ where } w \text{ is a scalar value.} \quad (6)$$

Equation (6) may be written as:

$w = P_3 X$ $u P_3 X = P_1 X$ $v P_3 X = P_2 X$ (7)

which may be further reduced to:

$$\begin{bmatrix} P_1 - u P_3 \\ P_2 - v P_3 \end{bmatrix} \cdot X = 0 \quad (8)$$

With known u, v, and P for the camera and the projector, two linear equations can be generated for each of the camera and the projector. In embodiments, singular value decomposition (SVD) can be used to solve the linear system of four equations for X.

After the triangulation, for each projector-camera pixel pair, a set of points, or cloud of points, represented by three-dimensional coordinates corresponding to each pair of correspondence is obtained 420. That is, for each projector pixel and the corresponding camera pixel, there is a corresponding three-dimensional display surface point.

Figure 5:
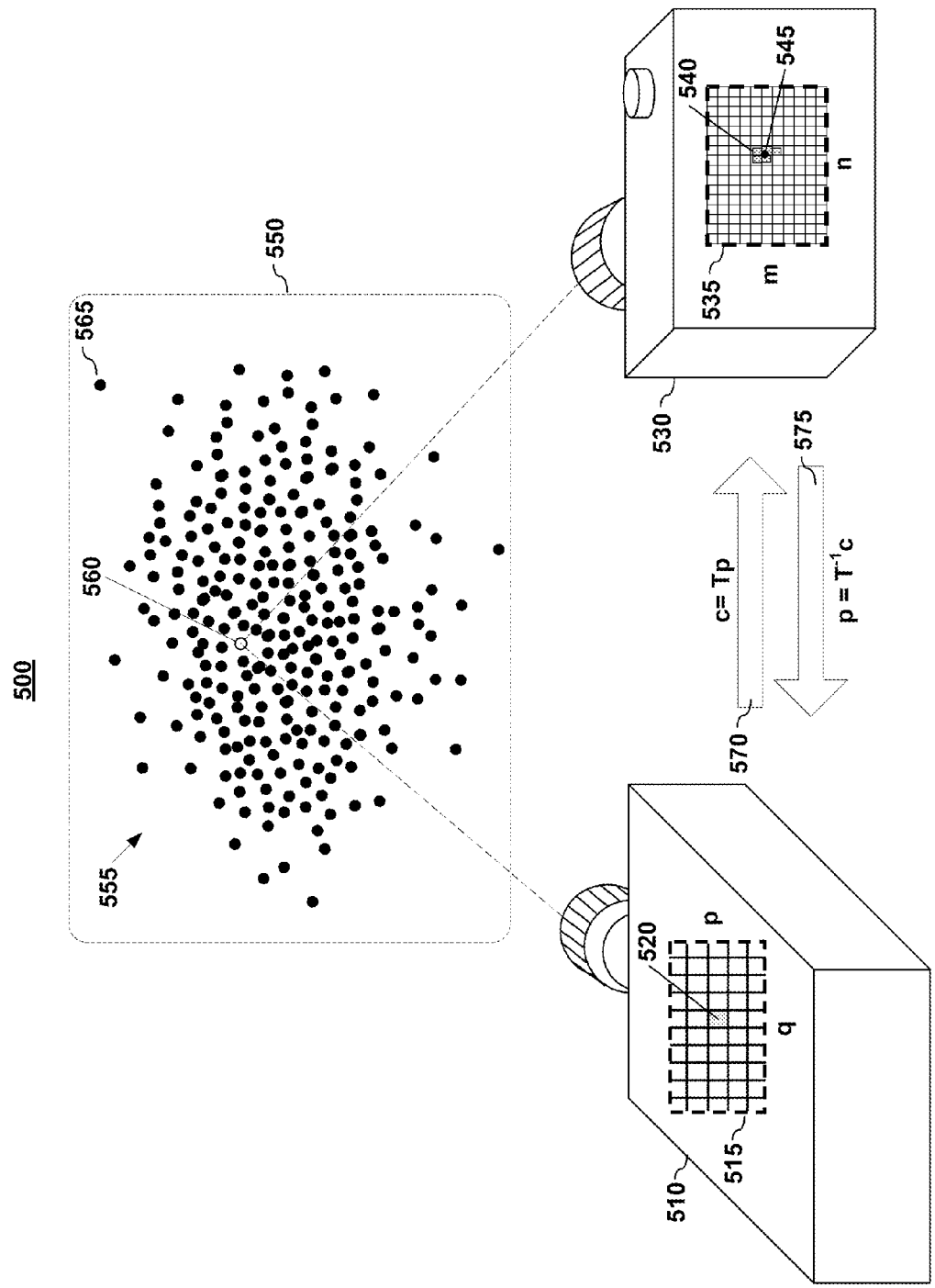
FIG. 5 illustrates aspects of reconstructing a display surface using a projector-camera stereo pair according to various embodiments of the invention.

FIG. 5 illustrates aspects of reconstructing a display surface using a projector-camera stereo pair according to various embodiments of the invention. Depicted in FIG. 5 is a projector 510, a camera 530, and a display surface 550, which may be a non-planar display surface. The projector 510 has an associated projector image 515, which comprises an array of pixels. Similarly, the camera 530 has an associated camera image 535, which comprises an array of pixels. A light transport matrix, T (570), for the display surface can be obtained that relates the camera image 535 to the projector image 515. Light rays emitting from the projector 510 are directed to the display surface 550 and some of them eventually reaches the camera sensor 535. The light rays from pixels in the projector reach the camera and form an m-by-n image, where each pixel in the camera receives a certain amount of light. If the image projected is represented as a (p×q)×1 vector p and the captured image is represented as an (m×n)×1 vector c, then the light transport between the projector and camera can be written as c=Tp, where T is called the light transport matrix.

The relationship between the camera and projector can also be represented by the inverse light transport matrix $T^{-1}$ as depicted 575 in FIG. 5. The inverse light transport matrix $T^{-1}$ is useful for many applications, such as inferring unknown projector images or analyzing the way light bounces in arbitrary scenes. For example, given a projector-camera system such that c=Tp and given c, to infer an unknown p the inverse transport matrix $T^{-1}$ is used to compute the projector image, $p = T^{-1} c$.

As noted above, because the camera image typically will contain more pixels than the projector, for each projector pixel (e.g, 520), a patch of camera pixels (e.g., 540) may be counted. In embodiments, the centroid (e.g., 545) of this patch (e.g., 540) of camera pixels may be used as the corresponding pixel for reconstruction.

Also depicted in FIG. 5 is a set of three-dimensional reconstructed display surface points 555. In embodiments, a surface representation with respect to the projector's pixel coordinates is considered first; and, each projector pixel (e.g., 520) corresponds to a display surface three-dimensional point (e.g., 560) and that point has a correspondence (e.g, 545) in the camera image.

Figure 6:
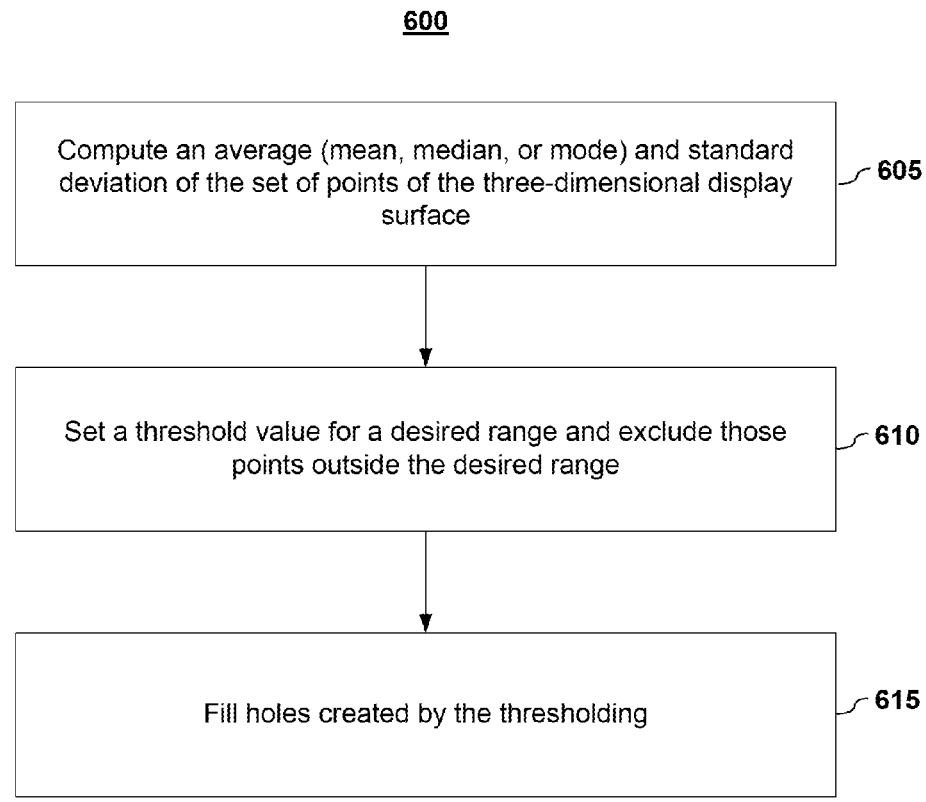
FIG. 6 depicts a method for improving the reconstruction of the display surface according to various embodiments of the invention.

In embodiments, because the set of display surface points may contain some outliers due to image noise, numerical errors, and/or other factors, additional processing may be performed to refine 425 the set of display surface points. One skilled in the art shall recognize that there are a number of ways to refine a set of data affected by noise or other artifacts, which ways may be employed herein. FIG. 6 depicts a method for refining the reconstruction of the display surface according to various embodiments of the invention.

The method 600 depicted in FIG. 6 commences by calculating 605 the statistical characteristics of the display surface positions. An average (mean, median, or mode) $[x_m, y_m, z_m]$ and deviation $[d_x, d_y, d_z]$ for the three-dimensional display surface positions is calculated 605. A threshold for a desired range is set and those points that are outside of the desired range are excluded 610. In embodiments, points that satisfy the following conditions are selected:

$$|x - x_m| < d_x \cdot \alpha, |y - y_m| < d_y \cdot \alpha, |z - z_m| < d_z \cdot \alpha \quad (9)$$

where α is a thresholding coefficient. In embodiments, α was set at a value of 2.8; however, one skilled in the art will recognize that other values may be used. In embodiments, α may be empirically selected by trying experiments with different values.

In embodiments, the calculation of an average (mean, median, or mode) and standard deviation and the thresholding process to exclude outlier points may be performed for each of a set of points (i.e., a local region) instead of being performed for the entire set of points. In embodiments, a local set of three-dimensional display surface points may be obtained by selecting a local window of pixels (e.g., a 5-by-5 pixel window) in the projector image plane or camera image plane and setting the local set of three-dimensional display surface points as those points that correspond to the local window of image plane pixels. In embodiments, the thresholding process may be performed within a local window but may use as the average (mean, median, or mode) and the standard deviation obtained from the entire set of points rather than from the local window.

After thresholding, the reconstructed display surface points may contain holes or invalid points because outliers were removed. That is, when a display surface point is excluded (e.g, 565 in FIG. 5), the pixel in the projector plane that corresponded to that excluded display surface point has a "hole" because it has no corresponding display surface point. One skilled in the art shall recognize that there are a number of ways to fill data gaps within a set or sets of data, including but not limited to interpolation. For example, in embodiments, to fill the holes, delaunay triangulation is applied on the point cloud with valid three-dimensional coordinates and then interpolate the hole using the nearest triangle that contains it.

In alternative embodiments, since the projector likely has a high resolution, the delaunay triangulation and interpolation method may be inefficient (the fastest implementation of Delaunay triangulation is O(n*log n), where n is the projector resolution (e.g., 1024×768)). To address this issue, a local triangulation and interpolation method may be used.

FIG. 7 depicts a method for efficiently filling holes in the reconstructed display surface according to various embodiments of the invention. The main concept behind the method 700 depicted in FIG. 7 is to use the nearest valid points (a neighborhood system) to compute a local delaunay triangulation for the holes (invalid points). For each hole, a window is dynamically defined as the neighborhood where there are enough valid points for performing the delaunay triangulation and interpolation. As illustrated in FIG. 7, in embodiments, a distance transformation, such as by way of example and not limitation a Chamfer Distance Transform operating on the two-dimensional image plane is used to compute 705 a distance map from the hole pixels to the valid pixels.

As the projector image plane is searched, when a hole is encountered, a local maximum of the distance map is found (710) and that distance value defines the window size. In embodiments, the local maximum is found by searching along the gradient ascent direction. Based upon the local window size, the corresponding three-dimensional surface points within the local window are delaunay triangulation, which is used to interpolate (715) the missing three-dimensional display surface point.

It should be noted that a camera will typically have much higher resolution than the projector. Recall, as illustrated in the FIG. 5, that a single projector pixel (e.g., 520) may correspond to a number of camera pixels (e.g., 540) and that a centroid (e.g., 545) was used for calculations. In embodiments, interpolation may be used to fill in the camera pixels. In embodiments, bilinear interpolation may be used to fill in the correspondence for the camera pixels to three-dimensional display surface points.

In alternative embodiments, the camera pixel correspondence with the display surface may be performed in like manner as described above with respect to the projector image plane. Namely, in embodiments, the interpolation may be performed by: (1) computing a distance map; (2) building local triangulation mesh; and (3) interpolating within the local triangulation mesh. However, it shall be noted that one skilled in the art shall recognize other ways for filling in the camera pixel correspondence map.

It should be noted that as a result there are two correspondence maps: the projector-pixel-to-3D-display-surface correspondence and the camera-pixel-to-3D-display-surface correspondence. And, it should also be noted that the projector pixels have a correspondence to the camera pixels via the three-dimensional display surface pixels. In embodiments, these correspondences are saved and may be used for fast re-calibration, as explained below.

4. Projection Correction and Fast Re-Calibration a) Real-Time Geometry Aware Rendering In embodiments, to project a perspective-correct image from an observing camera's point of view, the perspective correction is modeled as a direct texture mapping process. Since, in embodiments, the reconstructed surface is correlated with respect to the observing camera's image coordinate system, by defining a desired image from the camera's view, the image pixels can be directly mapped to the three-dimensional point cloud.

The warping from the desired image to the projector's input image may then be modeled as a direct rendering problem. In embodiments, OpenGL is used to render an array of vertices (representing the point cloud) with texture mapping from the desired image. However, one skilled in the art shall recognize that other graphics application programming interfaces may be used. The graphics-based warping also allows for real-time video projection.

A benefit of the systems and methods presented herein is that they provide the flexibility of handling two commonly faced re-calibration scenarios: a projector movement and a view change. The systems and methods presented herein are capable of automatically recalibration for adapting to these changes. In embodiments, the display surface covered by the projection is assumed to be non-planar.

b) Recalibrating Projector Movement

Figure 8:
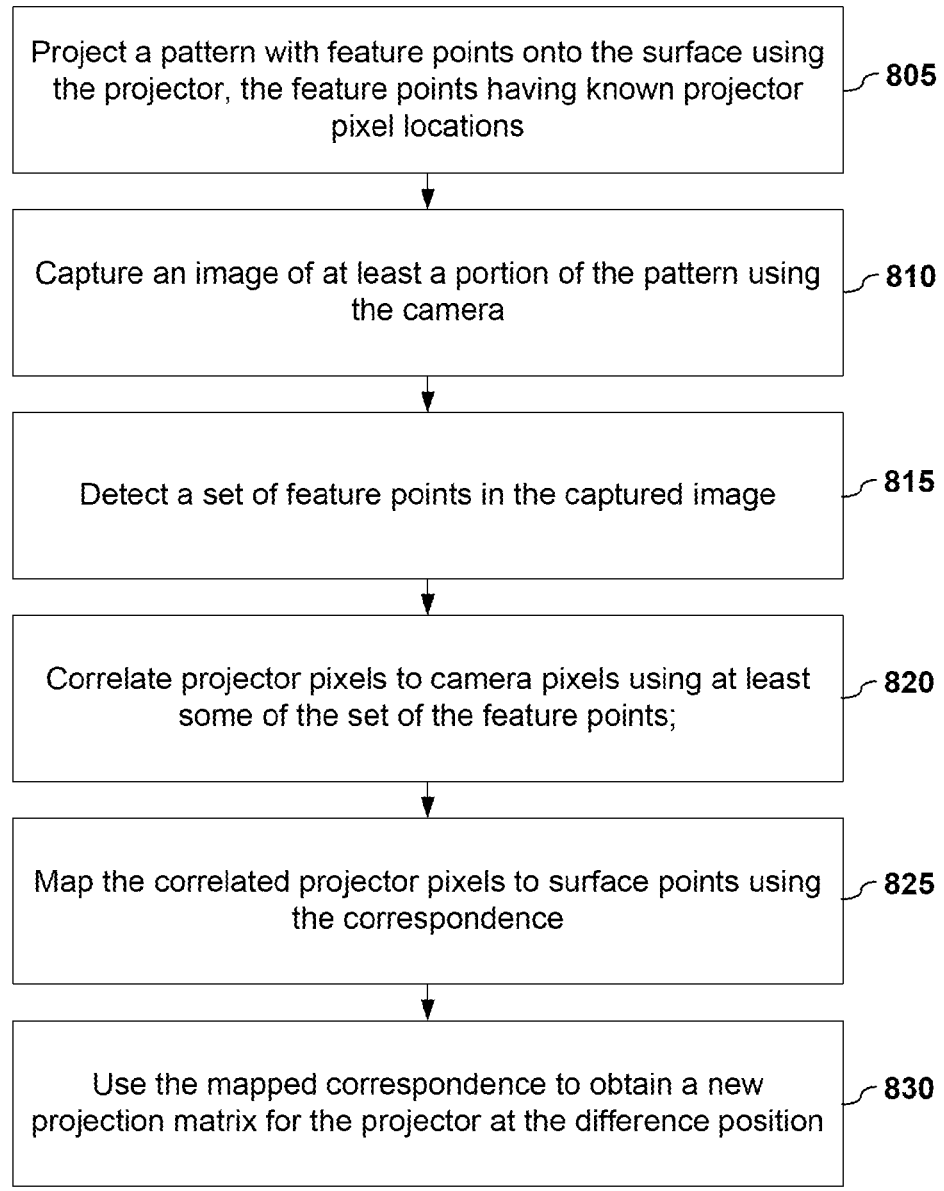
FIG. 8 illustrates a method of recalibrating a projector-camera system due to projector movement according to various embodiments of the invention.

During run-time, movement of the projector makes the compensation defined by the inverse light transform no longer valid. FIG. 8 illustrates a method of recalibrating a projector-camera system due to projector movement according to various embodiments of the invention.

In embodiments, to recalibrate a projector-camera system, a pattern, such as a checkerboard pattern, that covers all or a substantial portion of the projector image is projected (805). The pattern has features with known pixel locations in the projector image. The projected image is captured (810) by the fixed camera. A set of feature points, such as the checker pattern corners, are detected (815). In embodiments, a method proposed by W. Sun, X. Yang, S. Xiao, and W. Hu in "Robust Checkerboard Recognition For Efficient Nonplanar Geometry Registration In Projector-Camera Systems," *PROCAMS '08: Proceedings of the 5th ACM/IEEE International Workshop on Projector Camera Systems*, pp. 1-7, New York, N.Y., USA, 2008, ACM (which is incorporated herein by reference in its entirety), may be used to detect the checker corners under the distortions introduced by the nonplanar displaying surfaces; however, it shall be noted that no particular detection method is critical to the present invention.

The geometry map that has the point cloud of three-dimensional display surface points is used to obtain (820) the three-dimensional points that correspond to the detected feature point pixels in the stationary camera. Since the feature points in the projector image are known, a correspondence can be obtained (825) that relates the three-dimensional displaying surface points found from the correlation with the camera image points and the projector image pixels. That is, the two-dimensional pixel correspondences between the projector input image and the camera observed image are detected. Since the 3D-to-2D correspondences from the three-dimensional surface points to the camera pixels are known, the 3D-to-2D correspondence from the three-dimensional surface points to the projector input image pixels can be obtained. The new projection matrix for the projector then can be computed from the 3D-to-2D correspondence map. In embodiments, these three-dimensional points may be assumed to be non-coplanar; and therefore, they provide sufficient constraint for obtaining the new projection matrix, P, of the projector in the new pose, which shall be construed to mean a new position, a new orientation, or a new position and a new orientation.

In embodiments, the new projection matrix, P, may be obtained (830) as follows. Given a set of N pairs of 2D-3D point correspondences (x, X) between the two-dimensional projector image pixel coordinates (x) and three-dimensional display surface points (X), the transformation is given by the equation:

$$x=PX. \tag{10}$$

This is equivalent with the following equation:

$$x \times PX=0, \text{ where "x" represents the cross-product} \tag{11}$$

which equation can be rewritten as:

$$\begin{bmatrix} 0 & -X^T & yX^T \\ X^T & 0 & -xX^T \end{bmatrix} \begin{bmatrix} P^1 \\ P^2 \\ P^3 \end{bmatrix} = 0 \tag{12}$$

Thus, N correspondences yield 2N linear equations. In embodiments, singular value decomposition (SVD) is used to solve for the projection matrix.

In embodiments, by changing the projection matrix in OpenGL the correct warping for the new projector position can be rendered. It should be noted that if the three-dimensional points do not lie on the same plane, the constraints are sufficient to determine a unique solution. Otherwise, there might be ambiguities. However, this typically does not affect the rendering result, since either solution aims to minimize the re-projection error.

c) Projection for New View Location

In contrast to previous systems, the present systems and methods are able to create arbitrary viewing perspective rather than only from a fixed observing camera position. It shall be noted that the new view location from which an image or images projected from the projector are captured may be captured (viewed) by a viewer, which may be camera, a person, or a group of people.

FIG. 9 illustrates a method of recalibrating a projector-camera system due to camera movement according to various embodiments of the invention.

In embodiments, we consider a virtual viewing camera with the same intrinsics as the stationary observing camera, and position the center-of-projection (COP) of the virtual viewing camera to the user-desired location. The translation and rotation of the virtual viewing camera with respect to the fixed capturing camera that was used for the initial calibration is calculated (905). In embodiments, the translation and rotational information may be obtained by assuming the same intrinsic matrix for the camera projection matrix and by factoring out the intrinsic matrix from the camera matrix. In alternative embodiments, the translation and rotation information may be obtained from a position device, such as a laser pointer and sensors, a radio-frequency identification tag, infrared pointer and sensors, etc. In embodiments, a position device may be embedded within a remote control, wherein the position of the remote control is used as the viewing position. In yet another embodiment, a user interface can depict the projector-display environment and can receive from a user an input specifying a different viewpoint. The selection of the new view point as compared to the current view point can be used to compute the translation and rotation information.

Using the same intrinsic parameters, a new projection matrix of the virtual camera is computed (910). In embodiments, the new projection matrix may be computed by multiplying the intrinsic parameters with the translation and rotational information.

In embodiments, another way of recalibrating for a new viewpoint comprises place an observing camera at the desired viewing position, taking an image of the scene projected using the original light transport matrix, and then finding feature correspondences between the projected image and the camera-captured image. The 2D-to-3D correspondences from the projector pixel to the 3D surface points are already known, and the 3D-to-2D correspondences from the surface points to the camera pixels can be readily obtained. Therefore, the equations x=PX can be used to directly compute the new projection matrix. Notice that this re-calibration of camera projection matrix needs only one single image and is very fast.

In embodiments, to project perspective-correct images from the new point of view, the texture mapping process may be modified. In embodiments, the texture mapping may be implemented as a vertex shader program. The new camera's projection matrix may be set (915) as the input of the vertex shader, and the texture coordinate for every vertex in the three-dimensional point cloud are computed by projecting the vertex to the new camera's image plane using the projection matrix.

5. Computing Projection Under the New Projection Matrix

Once the camera viewpoint or the projector position has changed, the light transport matrix between the projector and the camera is no longer accurate. An updated light transport matrix for the new camera/projector position should be computed. In embodiments, an updated light transport matrix can be obtained by permuting the original light transport matrix.

For example, in embodiments, when the projector has changed its position, the following process may be used to compute an updated light transport matrix. For every row (e.g., $r_0$) of the light transport matrix, it corresponds to an original projector pixel (e.g., $[x_0,y_0]$), and its corresponding three-dimensional display surface point is found using the correspondence map. Next, the three-dimensional display point is projected using the new projector projection matrix to obtain its new pixel coordinate (e.g., $[x_1,y_1]$) and its new row position (e.g., $r_1$). In embodiments, when the pixel coordinates are not integers, sub-pixel interpolation may be performed within a local neighborhood of pixels (e.g., 4 neighboring pixels). In embodiments, a similar procedure can be applied for permuting the columns to compute the new light transport matrix.

In embodiments, to achieve real-time performance, computing the new light transport matrix and computing the multiplication of light transport matrix with the camera image may be implemented using a graphics processing unit (GPU), such as a Compute Unified Device Architecture (CUDA) GPU sold by NVIDIA of Santa Clara, Calif.

In embodiments, when the display surface is approximately all white and the radiometric distortion can be ignored, we can simplify the light transport matrix by a correspondence map. Consequently, the re-calibration can be directly acquired by exploiting the GPU graphics pipeline by using the multi-pass rendering. Specifically, when the observing camera (viewing camera) changes position, every surface point can be assigned a pixel color using the 3D-to-2D correspondence map. And, the three-dimensional display surface points are projected to the projector image plane and assigned pixel color values from the three-dimensional display surface point color. In embodiments, these steps may be directly implemented using a vertex shader. Therefore, the two-pass rendering will directly output the image as the input for the projector that will produce perspective-correct projection for the desired image at the viewing position. Similar process can be applied when we change the projector's position.

6. Interactive Drawing and Texturing

It should be noted that given the pixel-level geometry of the display surface (point cloud), an interactive geometry-aware drawing function may be implemented. Via a graphical user interface or other type of user interface, a user may create or draw an image or images from arbitrarily user-selected perspectives. The resultant image, warped for correct viewing, can then be projected onto the display surface.

In embodiments, the system can allow a user to select a range on the display surface and specify arbitrarily desired image or images as a texture to map to the selected display surface region. Consider, for purpose of illustration, the depictions shown in FIG. 10. For example, in embodiments, the system may display to a user a depiction of the display environment 1000-A and 1000-B or of the display surface 1040. The user can highlight or otherwise select a region (e.g., 1055-A, 1055-B) of the display surface 1040 for viewing and a viewing position (e.g., 1050-A, 1050-B). The projector-camera system (1010, 1020, and 1030), having been initially calibrated, can use the change in viewing position (e.g., from 1050-A to 1050-B) to adjust the image for proper viewing from the new view location (e.g., 1050-B).

Since the display surface is represented as a set of points that form a dense point cloud, a straight forward naive vertex selection algorithm may be time consuming, especially since the point cloud is used with respect to the camera's image coordinate system which could have a high resolution. The performance of adjusting to the new selection may be important if the user wants the drawing/image function to be real-time interactive. In embodiments, to speed up the selection and image adjustment, the point cloud set of display surface points may be stored to improve accessing. For example, in embodiments, a quad-tree-based level-of-detail method may be used to store the point cloud and perform the selection in a coarse-to-fine fashion, thereby reducing the running time from O(n) to O(log n).

C. System Embodiments

Figure 11:
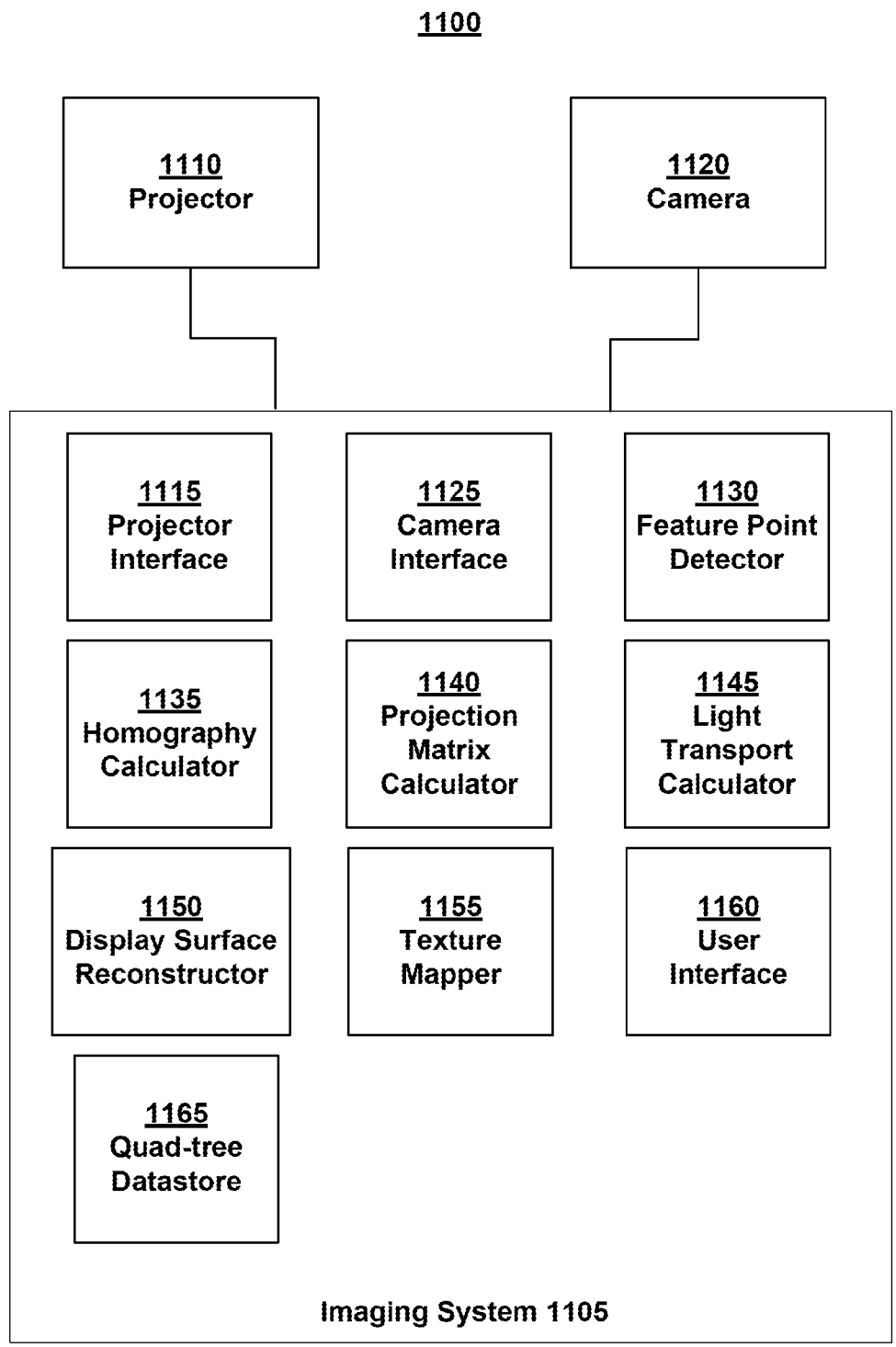
FIG. 11 depicts an embodiment of a calibration/recalibration system according to various embodiments of the invention.

FIG. 11 illustrates a projector-camera system according to various embodiments of the present invention. Depicted is an imaging system 1105 communicatively coupled to a projector 1110 and to a camera 1120. In the embodiment depicted in FIG. 11, imaging system 1105 comprises a projector driver 1115 that interfaces with the projector 1110. Projector driver 1115 supplies images to the projector 1110, including by way of example and not limitation, one or more images comprising a set of features and images adjusted for perspective-correct viewing. In the embodiment depicted in FIG. 11, imaging system 1105 comprises a camera driver 1125 that interfaces with the camera 1120. Camera driver 1120 receives images from the camera 820, including by way of example and not limitation, one or more images comprising a set of features.

In embodiments, imaging system 1105 also comprises a feature point detector 1130 that is communicatively coupled to receive the image or images captured by the camera. Feature point detector 1130 examines the captured image or images to identify the camera pixel locations of the feature points. For example, in embodiments, the projector driver 1115 causes the projector 1110 to display a set of checkerboard pattern images, the camera driver 1125 causes the camera 1120 to capture the set of checkerboard pattern images, and the feature point detector 1130 examines the a set of checkerboard pattern images for feature points. In embodiments, feature point detector 1130 receives the feature point locations in the projector image and uses that information to help locate the features in the captured image or images. One skilled in the art shall recognize that feature point detector 1130 may implement any of a number of feature point detection methods.

In embodiments, the imaging system 1105 also comprises a homography calculator 1135 that receives the information regarding the feature points correlated between the projector pixels and the captured image pixels. As discussed above, given known projector pixels and detected camera pixels, the homography can be computed using projector-camera pixel pairs. In embodiments, the homography calculator 1135 also calculates an inverse of the homography transform. In alternative embodiments, the imaging system 1105 comprises an inverse homography calculator (not shown) that receives a homography and computes an inverse of it.

In embodiments, the imaging system 1105 also comprises a projection matrix calculator 1140 that calculates the projection matrix for the camera and the projector. In embodiments, the projection matrix calculator 1140 calculates the projection matrices using one or more of the methods discussed above, for example, as discussed in relation to the methods associated with FIGS. 1, 3, 8, and 9. One skilled in the art shall recognize that the projector matrix may implement any of a number of methods of calculating a projection matrix.

In embodiments, the imaging system 1105 also comprises a light transport matrix calculator 1145 that computes a light transport matrix between the projector pixels and the captured image pixels. In embodiments, the light transport matrix calculator 1145 also computes at least an approximation of an inverse of the light transport matrix. In alternative embodiments, the imaging system 1105 comprises an inverse light transport matrix calculator (not shown) that receives a light transport and computes at least an approximation of it. In embodiments, a view projection matrix, which is an orthogonal version of a light transport matrix, may be used, and the inverse of the view projection matrix may be used as at least an approximation of an inverse light transport matrix, as discussed in U.S. patent application Ser. No. 11/623,016, filed on Jan. 12, 2007 (Pub. No. US 2007/0171382 A1), which claims the benefit of U.S. patent application Ser. No. 11/613, 129, filed Dec. 19, 2006, which claims the benefit under 35 U.S.C. §119(e) of U.S. Provisional Patent Application No. 60/762,178, filed Jan. 24, 2006, each of which incorporated by reference herein in its entirety.

In embodiments, the imaging system 1105 comprises a display surface reconstructor 1150 that uses the correspondences between projector pixels and camera pixels obtained from the inverse light transport matrix and the projection matrices to triangulate three-dimensional display surface points. In embodiments, the display surface reconstructor 1150 may implement one or more of the methods as discussed in relation to the methods associated with FIG. 4. In embodiments, the display surface reconstructor 1150 also performs additional post-processing. For example, the display surface reconstructor 1150 may refine the three-dimensional display surface points as discussed above. In embodiments, the display surface reconstructor 1150 may refine the display surface points by implementing one or more of the methods as discussed in relation to the methods associated with FIGS. 6 and 7.

In embodiments, the imaging system 1105 comprises a texture mapper 1155 for texture mapping. In various embodiments, the texture mapper 1155 may be implemented as a vertex shader.

In embodiments, the imaging system 1105 comprises a user interface module 1160 that facilitates the interaction between a user and embodiments of the present invention.

Figure 10:
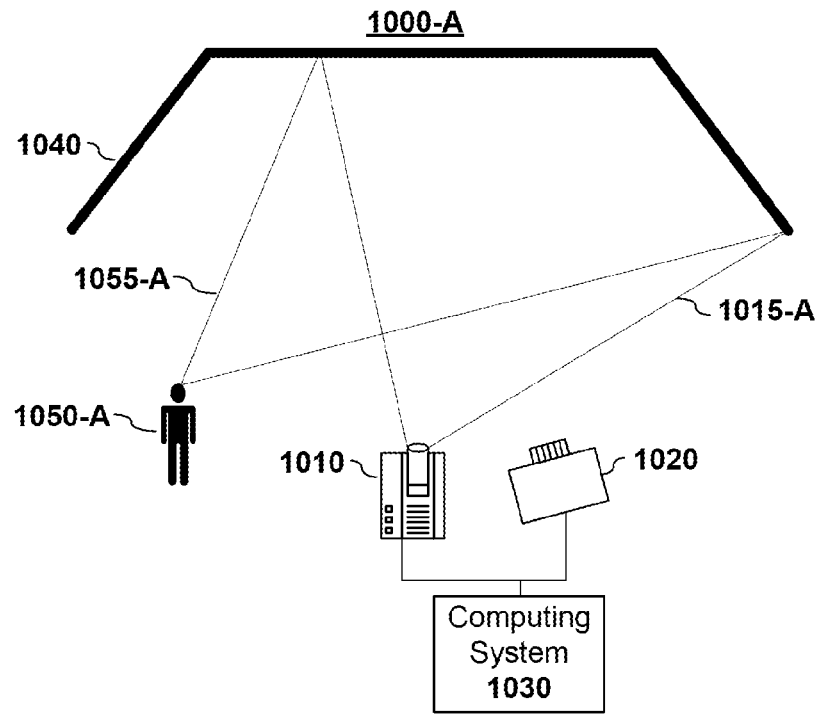
FIG. 10 depicts changing of viewing position and projection according to various embodiments of the invention.
Figure 10:
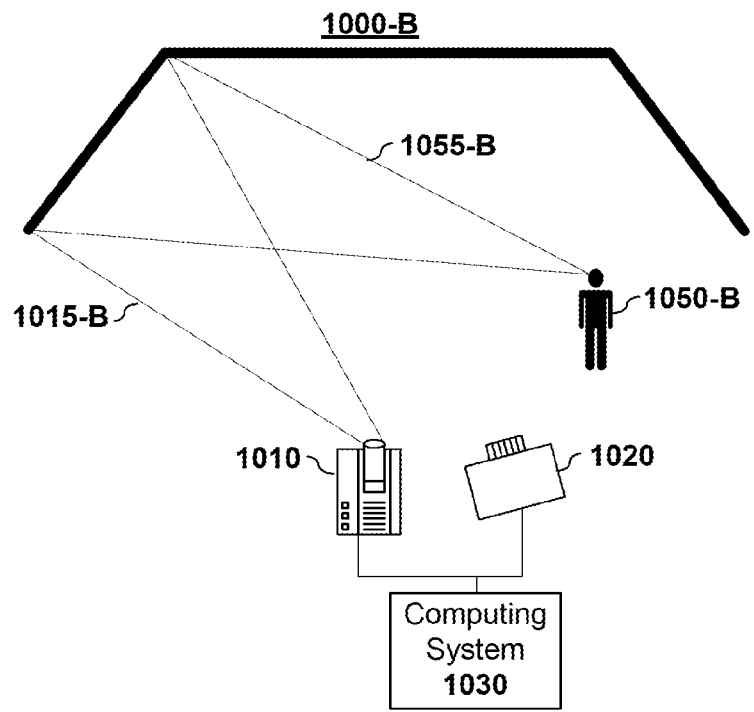

The user interface 1160 may be a graphical user interface in which the user interface graphically depicts the display environment to a user. In embodiments, the user interface may receive inputs from the users. The inputs may include: user alteration of the display environment in which the image for the new view location is altered so as to still be perspectively correct to a viewer, edits to a display image from any arbitrary user-selected perspective; and the like. FIG. 10 depicts an example of a display environment that may be presented to a user and allow a user to select section of a display environment for the projector to display the images, and in addition, may allow a user to select a user viewpoint.

In embodiments, the imaging system 1105 comprises a quad-tree datastore 1165 that facilitates the efficient storing and accessing of the three-dimensional display surface points. In embodiment, a quad-tree datastore employs a quad-tree level-of-detail method for storing at least some of the three-dimensional display surface points 1165.

In embodiments, a computing system may be configured to perform one or more of the methods presented herein. Systems that implement at least one or more of the methods described herein may comprise a calibration application operating on a computer system that interfaces with or receives data from (directly and/or indirectly) a projector and a camera. The computer system may comprise one or more computers and one or more databases. In embodiments, the calibration application may be part of projector or camera or may be a standalone device.

It shall be noted that the present invention may be implemented in any instruction-execution/computing device or system capable of processing image data, including without limitation, a general-purpose computer and a specific computer, such as one intended for data or image processing. It shall be noted that aspects of the present invention may also be implemented into other computing devices and systems, including without limitation, a digital camera, a projector, a multimedia device, and any other device that projects, processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 12:
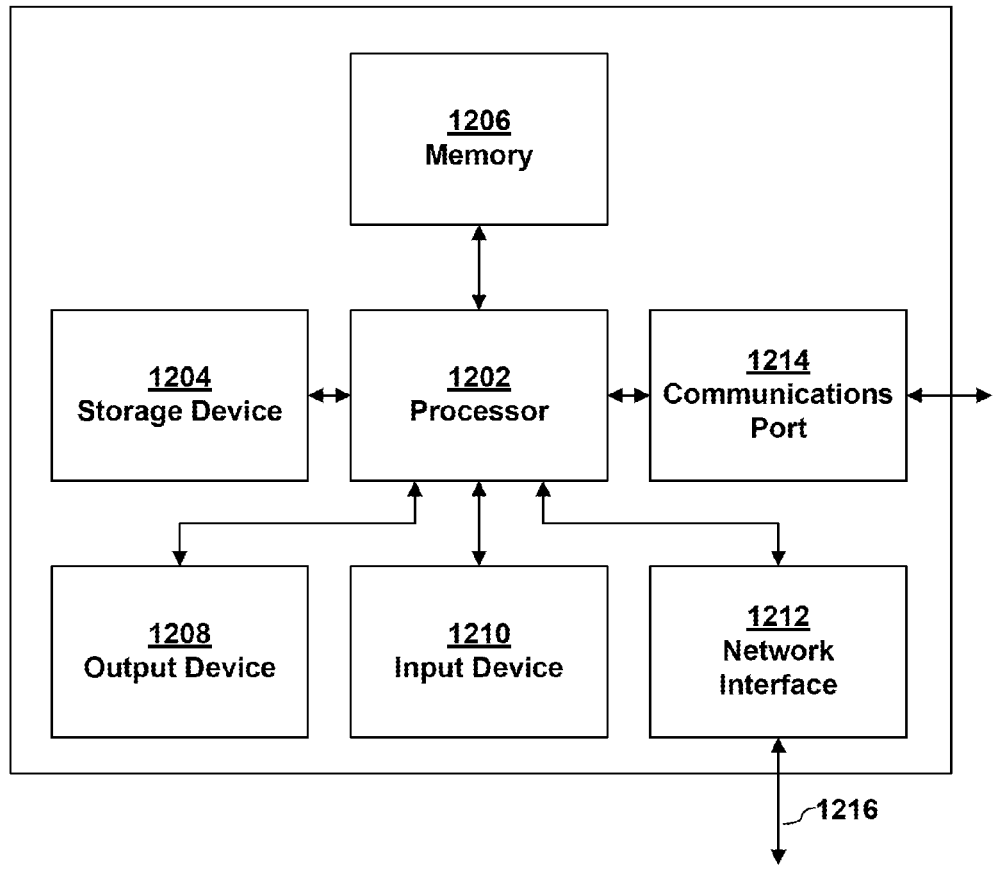
FIG. 12 depicts a computing system according to various embodiments of the invention.

FIG. 12 depicts a functional block diagram of an embodiment of an instruction-execution/computing device 1200 that may implement or embody embodiments of the present invention. As illustrated in FIG. 12, a processor 1202 executes software instructions and interacts with other system components. In an embodiment, processor 1202 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1204, coupled to processor 1202, provides long-term storage of data and software programs. Storage device 1204 may be a hard disk drive and/or another device capable of storing data, such as a computer-readable media (e.g., diskettes, tapes, compact disk, DVD, and the like) drive or a solid-state memory device. Storage device 1204 may hold programs, instructions, and/or data for use with processor 1202. In an embodiment, programs or instructions stored on or loaded from storage device 1204 may be loaded into memory 1206 and executed by processor 1202. In an embodiment, storage device 1204 holds programs or instructions for implementing an operating system on processor 1202. In one embodiment, possible operating systems include, but are not limited to, UNIX, AIX, LINUX, Microsoft Windows, and the Apple MAC OS. In embodiments, the operating system executes on, and controls the operation of, the computing system 1200.

An addressable memory 1206, coupled to processor 1202, may be used to store data and software instructions to be executed by processor 1202. Memory 1206 may be, for example, firmware, read only memory (ROM), flash memory, non-volatile random access memory (NVRAM), random access memory (RAM), or any combination thereof. In one embodiment, memory 1206 stores a number of software objects, otherwise known as services, utilities, components, or modules. One skilled in the art will also recognize that storage 1204 and memory 1206 may be the same items and function in both capacities. In an embodiment, one or more of the methods depicted herein may be embodied in one or more modules stored in a computer readable media, such as memory 1204, 1206, and executed by processor 1202.

In an embodiment, computing system 1200 provides the ability to communicate with other devices, other networks, or both. Computing system 1200 may include one or more network interfaces or adapters 1212, 1214 to communicatively couple computing system 1200 to other networks and devices. For example, computing system 1200 may include a network interface 1212, a communications port 1214, or both, each of which are communicatively coupled to processor 1202, and which may be used to couple computing system 1200 to other computer systems, networks, and devices.

In an embodiment, computing system 1200 may include one or more output devices 1208, coupled to processor 1202, to facilitate displaying graphics and text. Output devices 1208 may include, but are not limited to, a display, LCD screen, CRT monitor, printer, touch screen, or other device for displaying information. In embodiments, the dipole information may be used to graphically depict the body part under examination. In embodiments, the body part as part of a model of the body part and may also depict the body part at various time intervals. Computing system 1200 may also include a graphics adapter (not shown) to assist in displaying information or images on output device 1208.

One or more input devices 1210, coupled to processor 1202, may be used to facilitate user input. Input device 1210 may include, but are not limited to, a pointing device, such as a mouse, trackball, or touchpad, and may also include a keyboard or keypad to input data or instructions into computing system 1200.

In an embodiment, computing system 1200 may receive input, whether through communications port 1214, network interface 1212, stored data in memory 1204/1206, or through an input device 1210, from a scanner, copier, facsimile machine, projector, camera, sensors, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the spirit and scope of the present invention. It is therefore intended that the following claims include such modifications, permutation, and equivalents as fall within the spirit and scope of the present invention.

What is claimed is:

1. At least one non-transitory computer-readable medium storing one or more sequences of instructions, wherein execution of the one or more sequences of instructions by one or more processors causes the one or more processors to execute a computer-implemented method for calibrating a projector system comprising a camera and a projector, each being directed toward a display surface, the computer-implemented method comprising:
obtaining a correspondence that maps a set of projector pixels to a set of the camera pixels via a set of display surface points; and
responsive to the projector being at a different pose:
projecting a set of feature points onto the display surface using the projector, the set of feature points having known projector pixel locations;
capturing at least a portion of the set of feature points using the camera;
detecting a set of detected feature points from the set of feature points;
correlating projector pixels to camera pixels using at least some of the set of detected feature points;
mapping the correlated projector pixels to display surface points from the set of display surface points using the correspondence; and
using the mapped correspondence to obtain a new projection matrix for the projector at the difference pose.

2. The at least one non-transitory computer-readable medium of claim 1 wherein the step of obtaining a correspondence that maps a set of projector pixels to a set of the camera pixels via a set of display surface points comprises:
obtaining a projector projection matrix for the projector and a camera projection matrix for the camera;
using at least an approximation of an inverse light transport matrix to obtain correlation between projector pixels and camera pixels; and
using the correlation between projector pixels and camera pixels, the projector projection matrix, and the camera projection matrix to obtain the set of display surface points and the correspondence.

3. The at least one non-transitory computer-readable medium of claim 2 wherein the step of using the correlation between projector pixels and camera pixels, the projector projection matrix, and the camera projection matrix to obtain the set of display surface points and the correspondence comprises:
back-projecting from a projector image plane and from a camera image plane to triangulate a location for at least some of the display surface points in the set of display surface points.

4. The at least one non-transitory computer-readable medium of claim 2 further comprising the step of:
refining the set of display surface points.

5. The at least one non-transitory computer-readable medium of claim 4 wherein the step of refining the set of display surface points comprises the step of:
identifying a set of outlier points from the set of display surface points;
excluding the set of outlier points from the set of display surface points; and
generating a set of replacement points to replace the set of outlier points that were excluded.

6. The at least one non-transitory computer-readable medium of claim 5 wherein the step of generating a set of replacement points to replace the set of outlier points that were excluded comprises:
for each excluded point from the set of outlier points, using a set of valid display surface points to interpolate a value for the excluded point.

7. The at least one non-transitory computer-readable medium of claim 6 wherein the step of using a set of valid display surface points to interpolate a value for the excluded point comprises:
computing a distance map from at least some of the set of outlier points to a set of non-excluded display surface points; and
for an excluded point from the set of outlier points:
using a local maximum of the distance map to define a local window; and
computing a Delaunay triangulation using at least some of the set of non-excluded display surface points that are within the local window to interpolate a value for the excluded point.

8. The at least one non-transitory computer-readable medium of claim 1 further comprising:
using the new projection matrix to alter an image projected by the projector.

9. At least one non-transitory computer-readable medium storing one or more sequences of instructions, wherein execution of the one or more sequences of instructions by one or more processors causes the one or more processors to execute a computer-implemented method for calibrating a projector system comprising a camera and a projector, each being directed toward a display surface, the computer-implemented method comprising:
obtaining a correspondence that maps a set of projector pixels to a set of the camera pixels via a set of display surface points; and
responsive to having a view location at a position that is different than a position for the camera:
obtaining a new camera projection matrix for the view location; and using the correspondence to compute a new light projection matrix to alter an image projected by the projector.

10. The at least one non-transitory computer-readable medium of claim 9 wherein the step of using the correspondence to compute a new light projection matrix to alter an image projected by the projector comprises:
setting the new projection matrix as an input of a texture mapper; and
computing texture coordinates for every vertex in a set of display points from the set of display surface points by projecting a vertex to an image plane of the new view location using the new projection matrix.

11. The at least one non-transitory computer-readable medium of claim 9 wherein the step of using the correspondence to compute a new light projection matrix to alter an image projected by the projector comprises:
using the correspondence between the camera and the display surface to assign a color value to each point in a set of display points;
using a projector projection matrix to project the set of display points to a projector image plane; and
assigning pixel color values based upon the projected set of display points.

12. The at least one non-transitory computer-readable medium of claim 9 wherein the step of obtaining a new camera projection matrix for the view location comprises:
obtaining a translation and a rotation of the view location relative to the camera location; and
computing a new projection matrix using the translation and the rotation of the view location relative to the camera and using the camera's intrinsic parameters.

13. The at least one non-transitory computer-readable medium of claim 11 further comprising:
receiving the view location information from a user; and
computing the translation and the rotation of the view location relative to the camera location based upon the view location information.

14. The at least one non-transitory computer-readable medium of claim 13 wherein the step of receiving the view location information from a user comprises:
displaying a display environment comprising a depiction of the display surface and the position of the camera; and
receiving the view location information from the user that indicates the view location in the display environment.

15. The at least one non-transitory computer-readable medium of claim 9 wherein the step of obtaining a new camera projection matrix for the view location comprises:
projecting a set of feature points onto the display surface using the projector, the set of feature points having known projector pixel locations;
capturing at least a portion of the set of feature points using the camera;
detecting a set of detected feature points from the set of feature points;
correlating projector pixels to camera pixels using at least some of the set of detected feature points;
mapping the correlated projector pixels to display surface points from the set of display surface points using the correspondence; and
using the mapped correspondence to obtain the new camera projection matrix at the difference pose.

16. The at least one non-transitory computer-readable medium of claim 9 wherein the step of obtaining a correspondence that maps a set of projector pixels to a set of the camera pixels via a set of display surface points comprises:
obtaining a projector projection matrix for the projector and a camera projection matrix for the camera;
using at least an approximation of an inverse light transport matrix to obtain correlation between projector pixels and camera pixels; and
using the correlation between projector pixels and camera pixels, the projection matrix, and the camera projection matrix to obtain the set of display surface points and the correspondence.

17. The at least one non-transitory computer-readable medium of claim 13 wherein the step of using the correlation between projector pixels and camera pixels, the projection matrix, and the camera projection matrix to obtain the set of display surface points and the correspondence comprises:
back-projecting from a projector image plane and from a camera image plane to triangulate a location for at least some of the display surface points in the set of display surface points.

18. A computer system for recalibrating a projector system comprising a projector and a camera, the system comprising:
one or more processors; and
one or more non-transitory computer readable media in communication with the one or more processors and having stored thereon a set of instructions executable by the one or more processors, the set of instructions comprising:
obtaining a correspondence that maps a set of projector pixels to a set of the camera pixels via a set of display surface points; and
responsive to a change of pose of a view location from which an image projected from the projector is viewed by a viewer, using the correspondence to calculate a new camera projection matrix comprising
obtaining a translation and a rotation of the view location relative to the camera location;
computing a new projection matrix using the translation and the rotation of the view location relative to the camera and using the camera's intrinsic parameters; and
using the new camera projection matrix to obtain a new light projection matrix for altering an image projected by the projector.

19. A computer system for recalibrating a projector system comprising a projector and a camera, the system comprising:
one or more processors; and
one or more non-transitory computer readable media in communication with the one or more processors and having stored thereon a set of instructions executable by the one or more processors, the set of instructions comprising:
obtaining a correspondence that maps a set of projector pixels to a set of the camera pixels via a set of display surface points; and responsive to a change of pose of the projector, using the correspondence to calculate a new projection matrix comprising
- projecting a set of feature points onto the display surface using the projector, the set of feature points having known projector pixel locations;
- capturing at least a portion of the set of feature points using the camera;
- detecting a set of detected feature points from the set of feature points;
- correlating projector pixels to camera pixels using at least some of the set of detected feature points;
- mapping the correlated projector pixels to display surface points from the set of display surface points using the correspondence; and
- using the mapped correspondence to obtain the new projection matrix for the projector at the difference pose.

\* \* \* \* \*